United States Patent
Park et al.

(10) Patent No.: US 9,638,967 B2
(45) Date of Patent: May 2, 2017

(54) LIQUID CRYSTAL DISPLAY

(71) Applicant: Samsung Display Co., Ltd., Yongin (KR)

(72) Inventors: Seung Hyun Park, Seoul (KR); Jun Ho Song, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/663,564

(22) Filed: Mar. 20, 2015

(65) Prior Publication Data

US 2015/0268522 A1 Sep. 24, 2015

(30) Foreign Application Priority Data

Mar. 21, 2014 (KR) ........................ 10-2014-0033646

(51) Int. Cl.
*G02F 1/136* (2006.01)
*G02F 1/1343* (2006.01)
*G02F 1/1337* (2006.01)
*G02F 1/1333* (2006.01)

(52) U.S. Cl.
CPC .... *G02F 1/134363* (2013.01); *G02F 1/13439* (2013.01); *G02F 1/133707* (2013.01); *G02F 1/133345* (2013.01); *G02F 2001/134372* (2013.01)

(58) Field of Classification Search
None
See application file for complete search history.

(56) References Cited

U.S. PATENT DOCUMENTS

| | | | |
|---|---|---|---|
| 7,679,707 B2 * | 3/2010 | Tanaka | G02F 1/1337 349/122 |
| 7,924,386 B2 | 4/2011 | Lee | |
| 8,427,617 B2 * | 4/2013 | Tanaka | G02F 1/133512 349/123 |
| 2013/0087794 A1 | 4/2013 | Kwack | |
| 2013/0088675 A1 | 4/2013 | Ochiai et al. | |

FOREIGN PATENT DOCUMENTS

| | | |
|---|---|---|
| JP | 2007183299 | 7/2007 |
| JP | 2010230744 | 10/2010 |
| JP | 2012073464 | 4/2012 |
| JP | 2013097106 | 5/2013 |
| KR | 1020070067961 | 6/2007 |
| KR | 1020110066737 | 6/2011 |
| KR | 1020120136239 | 12/2012 |

* cited by examiner

*Primary Examiner* — Richard Kim
(74) *Attorney, Agent, or Firm* — Cantor Colburn LLP

(57) ABSTRACT

A liquid crystal display according to an exemplary embodiment of the invention includes a substrate, a gate line and a data line disposed on the substrate, a first passivation layer disposed on the gate line and the data line, a first electrode disposed on the first passivation layer, a second passivation layer disposed on the first electrode, and a second electrode disposed on the second passivation layer and including a plurality of first cutouts and a plurality of branch electrodes defined by the plurality of first cutouts, wherein the second passivation layer has a second cutout overlapping a portion of the plurality of first cutouts, and the second cutout is defined close to the end of the first cutout.

12 Claims, 12 Drawing Sheets

LIQUID CRYSTAL DISPLAY

This application claims priority to Korean Patent Application No. 10-2014-0033646 filed on Mar. 21, 2014, and all the benefits accruing therefrom under 35 U.S.C. §119, the entire contents of which are incorporated herein by reference.

BACKGROUND (a) Field

The invention relates to a liquid crystal display ("LCD"), and in detail, relates to an LCD without display quality deterioration when increasing transmittance.

(b) Description of the Related Art

A liquid crystal display ("LCD") is one of the most widely used flat panel displays, and displays images by applying voltages to field-generating electrodes to generate an electric field in an LC layer that determines orientations of LC molecules therein to adjust polarization of incident light.

The LCD may have light weight and thin formation thereof are easily obtained while it has a drawback in that side visibility is lower than front visibility, and liquid crystal arrangements and driving methods of various types have been developed to solve the drawback. To realize a wide viewing angle, an LCD having field generating electrodes on one substrate has been spotlighted.

In the LCD, at least one of two field generating electrodes of the pixel electrode and the common electrode has a plurality of cutouts, and a plurality of branch electrodes defined by the plurality of cutouts.

In a case of the liquid crystal molecules disposed at an end portion of the cutout and a portion where stem portions of the cutouts extending in different directions meet, an inclination direction of the liquid crystal molecules is irregular by an influence of the fringe fields generated by the end portion of the cutout and the portion where stem portions of the cutouts extending in different directions meet. Accordingly, in the end portion of the cutout and the center portion where the stem portions of the cutouts extending in different directions meet, a method of differentiating an angle of a longitudinal reference line from an angle between the center portion of the cutout and the longitudinal reference line has been proposed to prevent the irregular movement of the liquid crystal molecules.

SUMMARY

While a resolution of the liquid crystal display ("LCD") is increased, a size of each pixel of the LCD is decreased, and accordingly, when differentiating the angle between the cutout and the longitudinal reference line, the transmittance of the LCD is deteriorated.

The invention provides an LCD preventing transmittance deterioration due to an irregular movement of liquid crystal molecules in end portions of cutouts and a center portion where stem portions of the cutouts extending in different directions meet, and simultaneously preventing transmittance deterioration of the LCD while forming two field generating electrodes on one substrate and providing the cutouts to at least one of the two field generating electrodes.

An LCD according to an exemplary embodiment of the invention includes a substrate, a gate line and a data line disposed on the substrate, a first passivation layer disposed on the gate line and the data line, a first electrode disposed on the first passivation layer, a second passivation layer disposed on the first electrode, and a second electrode disposed on the second passivation layer and including a plurality of first cutouts and a plurality of branch electrodes defined by the plurality of first cutouts, where the second passivation layer has a second cutout overlapping a portion of the plurality of first cutouts, and the second cutout is provided to be close to the end of the first cutout.

The first cutout may include a first stem portion and a second stem portion extending in different directions, the first stem portion and the second stem portion may meet each other at a center portion, and the second cutout may be provided to be close to the end of the first cutout and the center portion.

The diameter of the second cutout may be from about 0.1 micrometer (μm) to about 5 μm.

An interval of the end of the first cutout and the second cutout may be from about 0.1 μm to about 3 μm, and an interval between the center portion and the second cutout may be from about 0.1 μm to about 3 μm.

A first thickness of the first electrode overlapping the second cutout may be less than a second thickness of the first electrode that does not overlap the second cutout.

The first electrode may have a plane shape of a plate that is provided through the whole pixel area.

The branch electrode of the second electrode may overlap the first electrode.

According to the LCD according to an exemplary embodiment of the invention, two field generating electrodes are disposed on one substrate, at least one of the two field generating electrodes has the cutout, the transmittance deterioration due to the irregular movement of the liquid crystal molecules is effectively prevented at the end portion of the cutout and the center portion where the stem portions of the cutouts extending in the different direction meet to each other, and simultaneously the transmittance deterioration of the LCD is effectively prevented.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
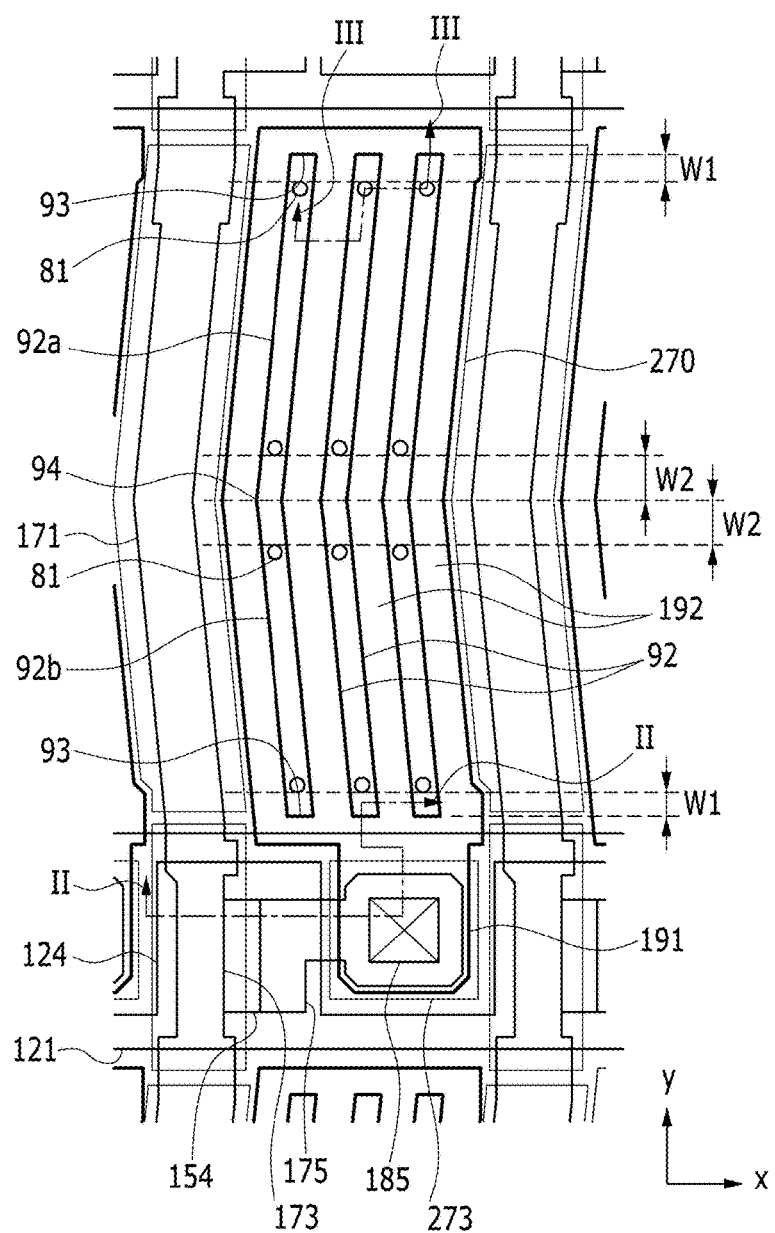
FIG. 1 is a plan view of an exemplary embodiment of a liquid crystal display ("LCD") according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Next, a liquid crystal display ("LCD") according to an exemplary embodiment of the invention will be described with reference to accompanying drawings.

Figure 2:
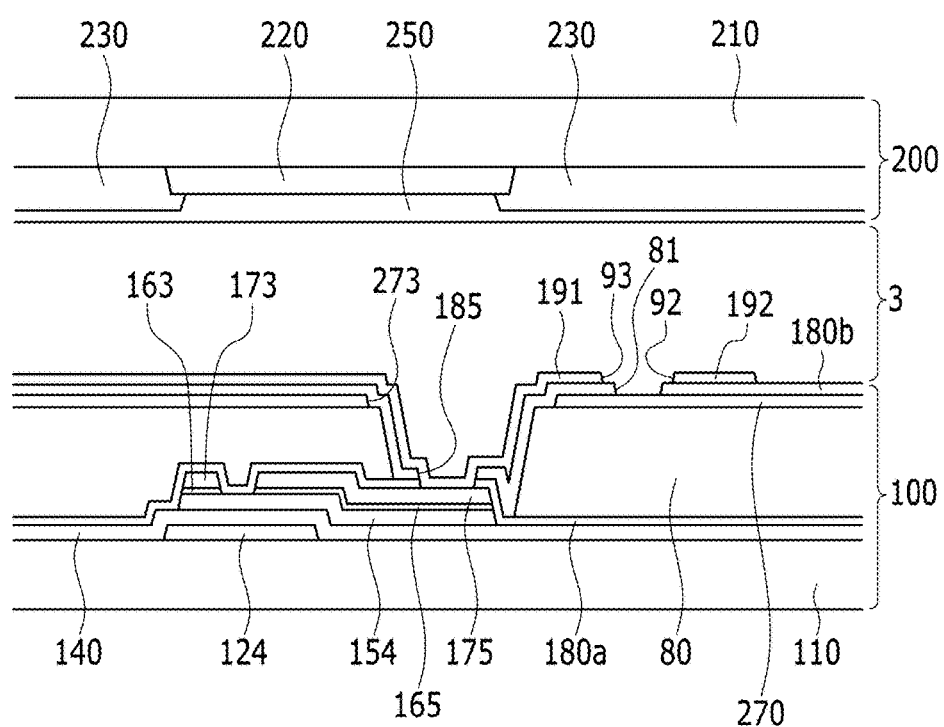
FIG. 2 is a cross-sectional view of the LCD of FIG. 1 taken along line II-II.
Figure 3:
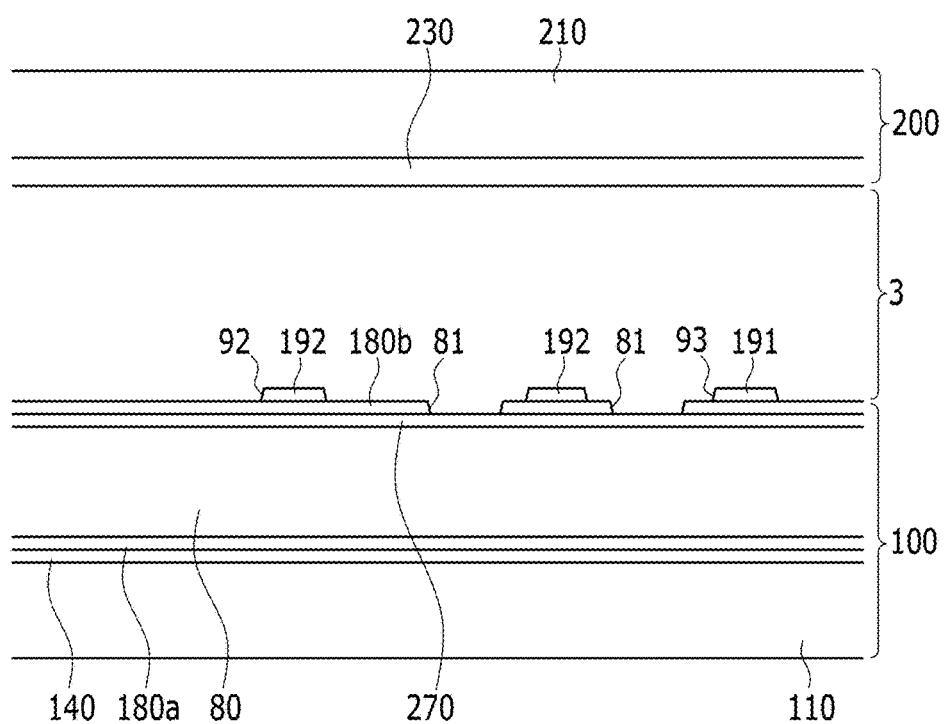
FIG. 3 is a cross-sectional view of the LCD of FIG. 1 taken along line III-III.

First, the LCD according to an exemplary embodiment of the invention will be described with reference to FIGS. 1 to 3. FIG. 1 is a plan view of an LCD according to an exemplary embodiment of the invention. FIG. 2 is a cross-sectional view of the LCD of FIG. 1 taken along line II-II. FIG. 3 is a cross-sectional view of the LCD of FIG. 1 taken along line III-III.

Referring to FIGS. 1 to 3, an LCD according to an exemplary embodiment of the invention includes a first display panel 100 and a second display panel 200 opposite to each other, and a liquid crystal layer 3 injected between the display panels.

Firstly, the first display panel 100 will be described.

A gate conductor including a gate line 121 is disposed on a first insulation substrate 110 including transparent glass or plastic.

The gate line 121 includes a gate electrode 124 and a wide gate pad portion (not illustrated) for connection with another layer or an external driving circuit. In an exemplary embodiment, the gate conductors 121 may include an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti). However, the invention is not limited thereto, and the gate line 121 may have a multilayered structure including at least two conductive layers having different physical properties.

A gate insulating layer 140 including a silicon nitride (SiNx) or a silicon oxide (SiOx) is disposed on the gate conductors 121 and 124. In an exemplary embodiment, the gate insulating layer 140 may have a multilayered structure including at least two insulating layers having different physical properties.

A semiconductor 154 including amorphous silicon or polysilicon is disposed on the gate insulating layer 140. In an exemplary embodiment, the semiconductor 154 may include an oxide semiconductor.

Ohmic contacts 163 and 165 are disposed on the semiconductor 154. In an exemplary embodiment, the ohmic contacts 163 and 165 may include a material such as n+ hydrogenated amorphous silicon in which an n-type impurity such as phosphorus is doped at a high concentration, or a silicide. In an exemplary embodiment, the ohmic contacts 163 and 165 may be disposed as a pair on the semiconductor 154. In the case where the semiconductor 154 is an oxide semiconductor, the ohmic contacts 163 and 165 may be omitted.

A data conductor including a data line 171 including a source electrode 173 and a drain electrode 175 is disposed on the ohmic contacts 163 and 165 and the gate insulating layer 140.

The data line 171 includes a data pad portion (not illustrated) for connection with another layer or an external driving circuit. The data line 171 transfers a data signal, and mainly extends in a vertical direction to cross the gate line 121.

In this case, the data line 171 may have a curved portion having a curved shape in order to obtain maximum transmittance of the LCD, and the curved portion may have a "V" shape where the curved portion meets in a middle region of a pixel area.

In an exemplary embodiment, the curved portion of the data line 171 may be bent to form an angle of about 7 degrees (°) with reference to a longitudinal reference line y (e.g., a reference line extending in a y direction) forming about 90° angle with reference to a direction (e.g., an x direction) that the gate line 121 extends.

The source electrode 173 is a portion of the data line 171 and is disposed on the same line as the data line 171. The drain electrode 175 may be provided to be parallel to the source electrode 173. Accordingly, the drain electrode 175 is parallel to the portion of the data line 171.

The gate electrode 124, the source electrode 173, and the drain electrode 175 form a thin film transistor ("TFT") in conjunction with the semiconductor 154, and a channel of the TFT is provided in the semiconductor 154 between the source electrode 173 and drain electrode 175.

The LCD according to the exemplary embodiment includes the source electrode 173 disposed on the same line as the data line 171 and the drain electrode 175 extending parallel to the data line 171 such that the width of the TFT may be increased without increasing the area occupied by the data conductor, thereby increasing the aperture ratio of the LCD.

In an exemplary embodiment, the data line 171 and the drain electrode 175 include a refractory metal such as molybdenum, chromium, tantalum, and titanium, or an alloy thereof, and may have a multilayered structure including a refractory metal layer (not shown) and a low resistance conductive layer (not shown). Examples of the multilayered structure may include a double layer of a chromium or molybdenum (alloy) lower layer and an aluminum (alloy) upper layer, and a triple layer of a molybdenum (alloy) lower layer, an aluminum (alloy) middle layer, and a molybdenum (alloy) upper layer. However, the invention is not limited thereto, and the data line 171 and the drain electrode 175 may include various metals or conductors in addition to this.

A first passivation layer 180a is disposed on the data conductors 171, 173, and 175, the gate insulating layer 140, and exposed portions of the semiconductor 154. In an exemplary embodiment, the first passivation layer 180a may include an organic insulating material, an inorganic insulating material, or the like.

An organic layer 80 is disposed on the first passivation layer 180a. In an exemplary embodiment, the organic layer 80 may include the organic material and may have a flat surface. In an exemplary embodiment, the organic layer 80 may be a color filter. When the organic layer 80 is a color filter, the organic layer 80 may uniquely display one of primary colors, and an example of the primary colors may include the three primary colors such as red, green, and blue, or yellow, cyan, and magenta, and the like.

The organic layer 80 may not be provided at a position where a first contact hole 185 that is described later is defined.

A common electrode 270 is disposed on the organic layer 80. In an exemplary embodiment, the common electrode 270 may include a transparent conductive material such as indium tin oxide ("ITO") or indium zinc oxide ("IZO"). The common electrode 270 may have a planar shape, may include a whole plate on an entire surface of the substrate 110. A first opening 273 may be defined in a region corresponding to a periphery of the TFT. The common electrodes 270 disposed in adjacent pixels may be connected to each other to receive a common voltage having a predetermined magnitude supplied from outside of a display region.

A second passivation layer 180b is disposed on the common electrode 270. The second passivation layer 180b may include the organic insulating material or the inorganic insulating material.

A pixel electrode 191 is disposed on the second passivation layer 180b. The pixel electrode 191 includes a curved edge that is almost parallel to the curved portion of the data line 171. The pixel electrode 191 has a plurality of first cutouts 92, and includes a plurality of first branch electrodes 192 disposed between the first adjacent cutouts 92. The first branch electrodes 192 of the pixel electrode 191 overlap the common electrode 270 with the planar shape.

The first cutout 92 has a first stem portion 92a and a second stem portion 92b extending in different directions from a center portion 94 disposed at a center region of the pixel area. Among the first cutout 92, the end portions of the first stem portion 92a and the second stem portion 92b meeting respective end portions 93 adjacent to the gate line 121 extend parallel to the first stem portion 92a and the second stem portion 92b. That is, the end portions of the stem portion 92a and 92b meeting respective end portions 93 of the first cutout 92 are parallel to the curved portion of the data line 171.

A second cutout 81 is defined in a portion of the second passivation layer 180b disposed between the common electrode 270 and the pixel electrode 191. The common electrode 270 is exposed by the second cutout 81.

By defining the second cutout 81 at the position adjacent to both end portions 93 of the first cutout 92 and the center portion 94, the intensity of the electric field between the common electrode 270 and the pixel electrode 191 may be increased at the position adjacent to both end portions 93 of the first cutout 92 and the center portion 94.

In an exemplary embodiment, the second cutout 81 is defined between the branch electrodes 192 of the pixel electrode 191, and a diameter of the second cutout 81 is from about 0.1 micrometer (μm) to about 5 μm. In exemplary embodiments, a shape of the second cutout 81 may be a shape having a curved surface such as a circle shape, an oval shape, or a polygon shape such as a triangle and a quadrangle. The second cutout 81 is defined at the position that does not overlap the pixel electrode 191.

In an exemplary embodiment, a first interval W1 between the second cutout 81 and both end portions 93 of the first cutout 92 is from about 0.1 μm to about 3 μm, for example. Also, in an exemplary embodiment, a second interval W2 between the second cutouts 81 from the center portion 94 of the pixel area between the first stem portion 92a and the second stem portion 92b of the first cutout 92 is from about 0.1 μm to about 3 μm, for example. The first interval W1 and the second interval W2 may be equal to or different from each other.

As described above, by defining the second cutouts 81 at the position adjacent to both end portions 93 of the first cutout 92 and the center portion 94, at the position adjacent to the second cutout 81, the intensity of the electric field generated between the common electrode 270 and the pixel electrode 191 may be further increased.

As described above, by further increasing the intensity of the electric field generated between the common electrode 270 and the pixel electrode 191 at the position adjacent to both end portions 93 of the first cutout 92 and the center portion 94, the irregular movement of the liquid crystal molecules generated at both end portions 93 of the first cutout 92 and the center portion 94 may be effectively prevented from being moved along with the first stem portion 92a and the second stem portion 92b of the first cutout 92.

Accordingly, although the center portion 94 in which the first stem portion 92a and the second stem portion 92b meet each other and both end portions 93 of the first cutout 92 are provided to have the different angle from the first stem portion 92a and the second stem portion 92b, the transmittance deterioration due to the irregular movement of the liquid crystal molecules may be effectively prevented in the end portions of the cutouts and the center portion where the stem portions of the cutouts extending in the different directions meet each other.

Also, the center portion 94 in which the first stem portion 92a and the second stem portion 92b meet each other and both end portions 93 of the first cutout 92 do not have the different angles from the first stem portion 92a and the second stem portion 92b, the transmittance deterioration of the LCD may be effectively prevented.

A first alignment layer (not shown) is disposed on the pixel electrode 191.

Next, the second display panel 200 will be described.

A light blocking member 220, a color filter 230, an overcoat 250, and a second alignment layer (not shown) are disposed on a second substrate 210 including transparent glass or plastic. Also, according to the LCD according to another exemplary embodiment of the invention, at least one of the color filter 230 and the light blocking member 220 may be provided in the first display panel 100.

The liquid crystal layer 3 may have positive dielectric anisotropy or negative dielectric anisotropy. The liquid crystal molecules of the liquid crystal layer 3 may be aligned to have a pretilt in a predetermined direction, and the pretilt direction of the liquid crystal molecules may be changed according to the dielectric anisotropy of the liquid crystal layer 3.

A backlight unit (not shown) generating and providing light to the two display panels 100 and 200 may be provided outside the substrate 110 of the first display panel 100.

The pixel electrode 191 applied with the data voltage generates an electric field in the liquid crystal layer 3 together with the common electrode 270 applied with a common voltage, thereby determining the orientation of the liquid crystal molecules of the liquid crystal layer 3 and displaying a corresponding image.

Next, an LCD according to another exemplary embodiment of the invention will be described with reference to FIG. 4 as well as FIGS. 1 and 2.

Figure 4:
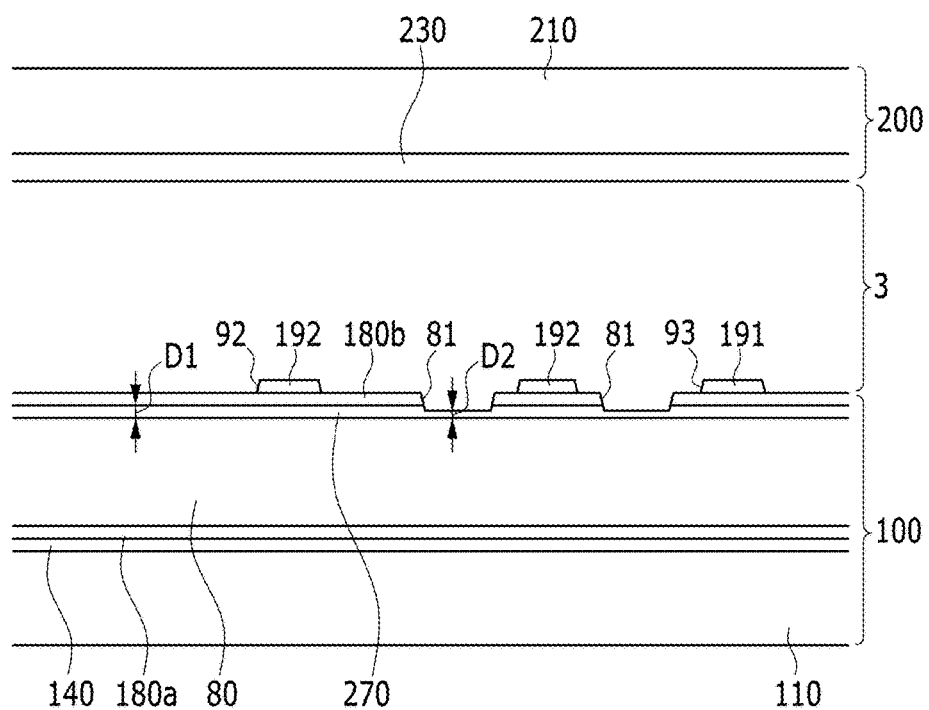
FIG. 4 is a cross-sectional view of another exemplary embodiment of an LCD according to the invention taken along the line III-III of FIG. 1.

Referring to FIG. 4 as well as FIGS. 1 and 2, the LCD according to the exemplary embodiment is similar to the LCD according to the exemplary embodiment shown in FIGS. 1 to 3. The detailed description for the same constituent elements is omitted.

Firstly, the first display panel 100 will be described.

The gate conductor including the gate line 121 is disposed on the first insulation substrate 110.

The gate line 121 includes the gate electrode 124 and the wide gate pad portion (not illustrated) for connection with another layer or an external driving circuit.

In an exemplary embodiment, the gate insulating layer 140 including a silicon nitride (SiNx) or a silicon oxide (SiOx), for example, is disposed on the gate conductors 121 and 124.

The semiconductor 154 including amorphous silicon or polysilicon, for example, is disposed on the gate insulating layer 140. In an exemplary embodiment, the semiconductor 154 may include the oxide semiconductor, for example.

The ohmic contacts 163 and 165 are disposed on the semiconductor 154. The ohmic contacts 163 and 165 may be disposed as a pair on the semiconductor 154. In the case where the semiconductor 154 is an oxide semiconductor, the ohmic contacts 163 and 165 may be omitted.

The data conductor including the data line 171 including a source electrode 173 and a drain electrode 175 is disposed on the ohmic contacts 163 and 165 and the gate insulating layer 140.

The data line 171 includes the data pad portion (not illustrated) for connection with another layer or the external driving circuit. The data line 171 transfers a data signal and mainly extends in a vertical direction to cross the gate line 121.

In this case, the data line 171 may have a curved portion having a curved shape in order to obtain maximum transmittance of the LCD, and the curved portion may have a "V" shape where the curved portion meets in a middle region of a pixel area.

The source electrode 173 is a portion of the data line 171 and is disposed on the same line as the data line 171. The drain electrode 175 may be provided to be parallel to the source electrode 173. Accordingly, the drain electrode 175 is parallel to the portion of the data line 171.

The gate electrode 124, the source electrode 173, and the drain electrode 175 form the TFT in conjunction with the semiconductor 154, and the channel of the TFT is provided in the semiconductor 154 between the source electrode 173 and drain electrode 175.

The first passivation layer 180a is disposed on the data conductors 171, 173, and 175, the gate insulating layer 140, and the exposed portion of the semiconductor 154. The first passivation layer 180a may include the organic insulating material or the inorganic insulating material.

The organic layer 80 is disposed on the first passivation layer 180a. The organic layer 80 is disposed on the data line 171, thereby preventing unnecessary coupling between the electrodes disposed on the organic layer 80 and the data line 171.

The organic layer 80 may be not provided at a position where a first contact hole 185 that is described later is defined.

The common electrode 270 is disposed on the organic layer 80. The common electrode 270 may have the planar shape, may be provided as a whole plate on an entire surface of the substrate 110, and has the first opening 273 disposed in the region corresponding to the periphery of the TFT. The common electrodes 270 disposed in adjacent pixels may be connected to each other to receive a common voltage having a predetermined magnitude supplied from outside of a display region.

The second passivation layer 180b is disposed on the common electrode 270. The second passivation layer 180b may include the organic insulating material or the inorganic insulating material.

The pixel electrode 191 is disposed on the second passivation layer 180b. The pixel electrode 191 includes the curved edge that is almost parallel to the curved portion of the data line 171. The pixel electrode 191 has the plurality of first cutouts 92, and includes the plurality of first branch electrodes 192 disposed between the first adjacent cutouts 92. The first branch electrodes 192 of the pixel electrode 191 overlap the common electrode 270 of the surface shape.

The first cutout 92 has the first stem portion 92a and the second stem portion 92b extending in the different directions from the center region of the pixel area. Among the first cutout 92, the end portions of the first stem portion 92a and the second stem portion 92b meeting both end portions 93 adjacent to the gate line 121 extend parallel to the first stem portion 92a and the second stem portion 92b. That is, the end portions of the stem portion meeting both end portions 93 of the first cutout 92 are parallel to the curved portion of the data line 171.

The portion of the second passivation layer 180b disposed between the common electrode 270 and the pixel electrode 191 has the second cutout 81. The common electrode 270 is exposed by the second cutout 81. According to the exemplary embodiment of the LCD of the invention, differently from the exemplary embodiment shown in FIGS. 1 to 3, a first thickness D1 of the common electrode 270 exposed by the second cutout 81 is less than a second thickness D2 of the common electrode 270 of the other portion. That is, a height of the common electrode 270 exposed through the second cutout 81 is lower than the height of the common electrode 270 of the other portion. When defining the second cutout 81, the portion of the common electrode 270 may be removed together.

In an exemplary embodiment, the second cutout 81 is defined between the branch electrodes 192 of the pixel electrode 191, and the diameter of the second cutout 81 is from about 0.1 μm to about 5 μm, for example.

In an exemplary embodiment, the first interval W1 between the second cutout 81 and both end portions 93 of the first cutout 92 is from about 0.1 μm to about 3 μm. Also, the second interval W2 between the second cutouts 81 from the center portion 94 of the pixel area between the first stem portion 92a and the second stem portion 92b of the first cutout 92 is from about 0.1 μm to about 3 μm, for example.

As described above, by defining the second cutouts 81 at the position adjacent to both end portions 93 of the first cutout 92 and the center region of the pixel area, at the position adjacent to the second cutout 81, the intensity of the electric field generated between the common electrode 270 and the pixel electrode 191 may be increased.

As described above, by further increasing the intensity of the electric field generated between the common electrode 270 and the pixel electrode 191 at the position adjacent to both end portions 93 of the first cutout 92 and the center region of the pixel area, the irregular movement of the liquid crystal molecules generated at both end portions 93 of the first cutout 92 and the center region of the pixel area may be effectively prevented from being moved along with the first stem portion 92a and the second stem portion 92b of the first cutout 92.

Accordingly, although the center portion in which the first stem portion 92a and the second stem portion 92b meet each other and both end portions 93 of the first cutout 92 are defined to have the different angle from the first stem portion 92a and the second stem portion 92b, the transmittance deterioration due to the irregular movement of the liquid crystal molecules may be effectively prevented in the end portions of the cutouts and the center portion where the stem portions extending in the different direction meet each other.

Also, the center portion in which the first stem portion 92a and the second stem portion 92b meet each other and both end portions 93 of the first cutout 92 are not provided to have the different angle from the first stem portion 92a and the second stem portion 92b, the transmittance deterioration of the LCD may be effectively prevented.

The first alignment layer (not shown) is disposed on the pixel electrode 191.

Next, the second display panel 200 will be described.

The light blocking member 220, the color filter 230, the overcoat 250, and the second alignment layer (not shown) are disposed on the second substrate 210 including transparent glass or plastic. Also, according to the LCD according to another exemplary embodiment of the invention, at least one of the color filter and the light blocking member may be provided in the first display panel 100.

The liquid crystal layer 3 may have positive dielectric anisotropy or negative dielectric anisotropy. The liquid crystal molecules of the liquid crystal layer 3 may be aligned to have the pretilt in a predetermined direction, and the pretilt direction of the liquid crystal molecules may be changed according to the dielectric anisotropy of the liquid crystal layer 3.

The backlight unit (not shown) generating and providing light to the two display panels 100 and 200 may be provided outside the substrate 110 of the first display panel 100.

The pixel electrode 191 applied with the data voltage generates an electric field in the liquid crystal layer 3 together with the common electrode 270 applied with a common voltage, thereby determining the orientation of the liquid crystal molecules of the liquid crystal layer 3 and displaying the corresponding image.

Figure 5:
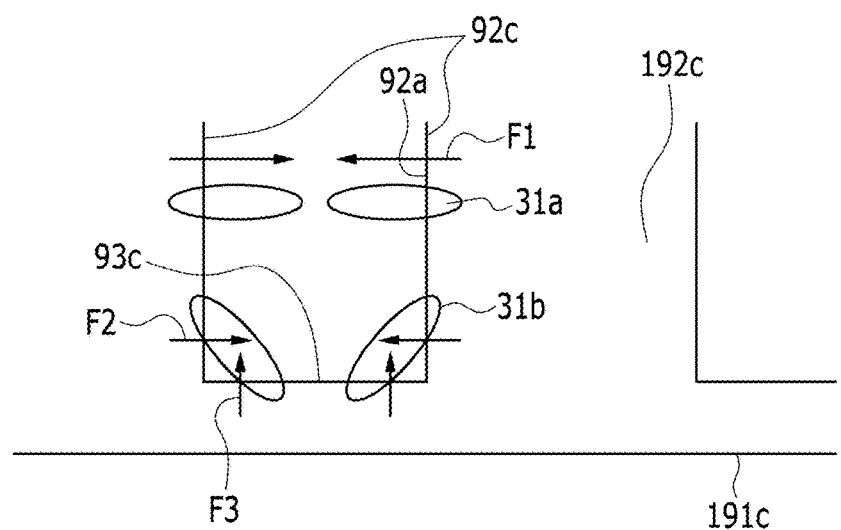
FIG. 5 is a schematic view of a portion of a conventional LCD.
Figure 6:
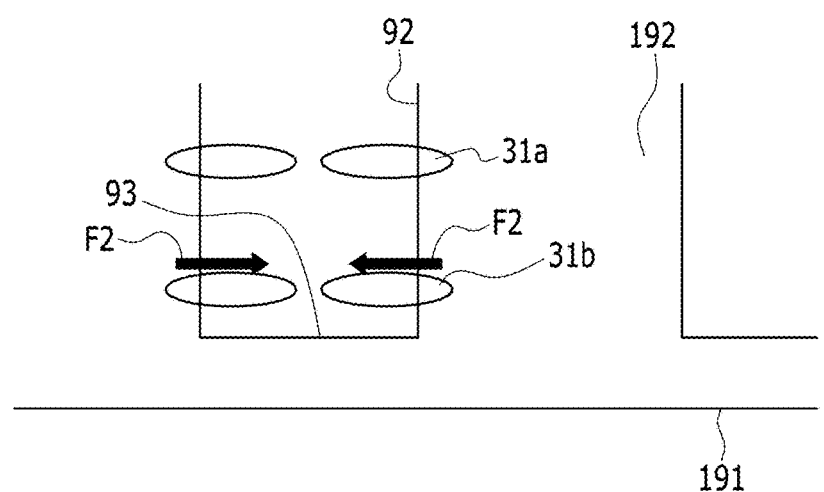
FIG. 6 is a schematic view of an exemplary embodiment of a portion of an LCD according to the invention.

Next, the electric field of the LCD according to an exemplary embodiment of the invention will be described with reference FIGS. 5 and 6. FIG. 5 is a schematic view of a portion of a conventional LCD, and FIG. 6 is a schematic view of a portion of an LCD according to an exemplary embodiment of the invention.

Referring to FIG. 5, according to the conventional LCD, the fringe field is applied in the direction vertical to the edge of a cutout 92c defined in a field generating electrode 191a.

In a case of the stem portion of the cutout 92c, a first fringe field F1 is generated in the direction vertical to the edge of the stem portion of the cutout 92c, thereby first liquid crystal molecules 31a disposed near the stem portion of the cutout 92c are rotated parallel to the direction of the first fringe field F1 and then are collided, and are finally rotated in the direction parallel to the length direction that branch electrodes 192c extend.

In contrast, in a case of an end portion 93c of the cutout 92c, a second fringe field F2 and a third fringe field F3 are generated in the direction vertical to the edges that are perpendicular to each other and form the end of the cutout 92c, thereby second liquid crystal molecules 31b disposed near the end of the cutout 92c are rotated parallel to the direction of a vector sum of the second fringe field F2 and the third fringe field F3. Accordingly, the rotation direction of the second liquid crystal molecules 31b is different from the rotation direction of the first liquid crystal molecules 31a.

Also, third liquid crystal molecules (not shown) of the conventional LCD disposed at the center portion (i.e., a portion corresponding to the center portion 94 in FIG. 1) where the stem portions extending in the different directions among the cutout 92c meet have the different direction from the rotation direction of the first liquid crystal molecules 31a.

Accordingly, the rotation direction of the liquid crystal molecules disposed near the end of the cutout 92c and at the center portion where the stem portions extending in the different directions meet becomes irregular, thereby the transmittance deterioration is generated near the end of the cutout 92c. The irregular movement of the liquid crystal molecules may be generated according to the stem portion of the cutout 92c. Accordingly, to prevent the irregular movement of the liquid crystal molecules from the movement according to the stem portion, the end portion 93c of the cutout 92c and the center portion are provided to have the different angle from the stem portion. However, when the end portion 93c of the cutout 92c and the center portion are provided to have the different angle from the stem portion, the rotation of the liquid crystal molecules is various such that the transmittance of the LCD may be deteriorated.

Referring to FIGS. 1 and 6, according to the LCD according to an exemplary embodiment of the invention, by defining the second cutout 81 at the position adjacent to both end portions 93 of the first cutout 92 and the center portion 94, the second fringe field F2 between the common electrode 270 and the pixel electrode 191 may be increased at the position near both end portions 93 of the first cutout 92 and the center portion 94. Accordingly, the liquid crystal molecules corresponding to the position adjacent to both end portions 93 of the first cutout 92 and the center portion 94 are less affected by the irregular movement generated at both end portions 93 of the first cutout 92 and the center portion 94, and more affected by the influence of the stronger second fringe field F2.

As described above, by defining the second cutout 81 at the position adjacent to both end portions 93 of the first cutout 92 and the center portion 94, the intensity of the electric field generated between the common electrode 270 and the pixel electrode 191 is further increased at the position adjacent to both end portions 93 of the first cutout 92 and the center portion 94 such that the irregular movement of the liquid crystal molecules generated in both end portions 93 of the first cutout 92 and the center portion 94 may be effectively prevented from being moved along with the first stem portion 92a and the second stem portion 92b of the first cutout 92.

Accordingly, although the center portion 94 in which the first stem portion 92a and the second stem portion 92b meet each other and both end portions 93 of the first cutout 92 are provided to have the different angle from the first stem portion 92a and the second stem portion 92b, the transmittance deterioration due to the irregular movement of the liquid crystal molecules may be effectively prevented in the end portions of the cutouts and the center portion where the stem portions extending in the different direction meet each other.

Figure 7A:
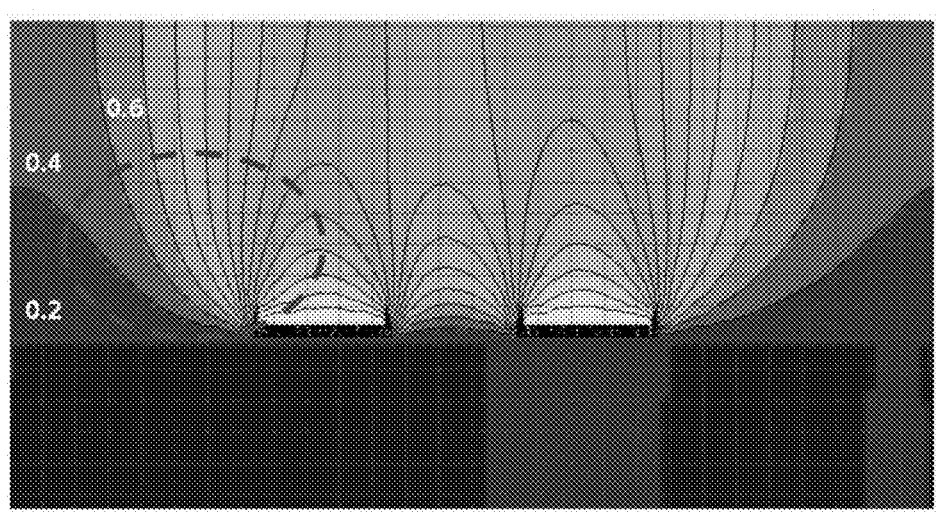
FIGS. 7A and 7B are graphs of experimental examples showing intensity of an electric field according to the conventional LCD and the exemplary embodiment of the LCD of the invention, respectively.

Next, experimental examples of the conventional LCD and the exemplary embodiment of the LCD of the invention will be described with reference to FIGS. 7A and 7B, respectively. In the experimental examples, in a case in which the second cutout 81 is not defined in the second passivation layer 180b of the conventional LCD and a case in which the second cutout 81 is defined in the second passivation layer 180b of the LCD according to an exemplary embodiment of the invention, the intensity of the electric field is measured and a result thereof is shown in FIG. 7. FIG. 7A shows the intensity of the electric field of the conventional LCD, and FIG. 7B shows the intensity of the electric field of the LCD according to an exemplary embodiment of the invention.

Figure 7B:
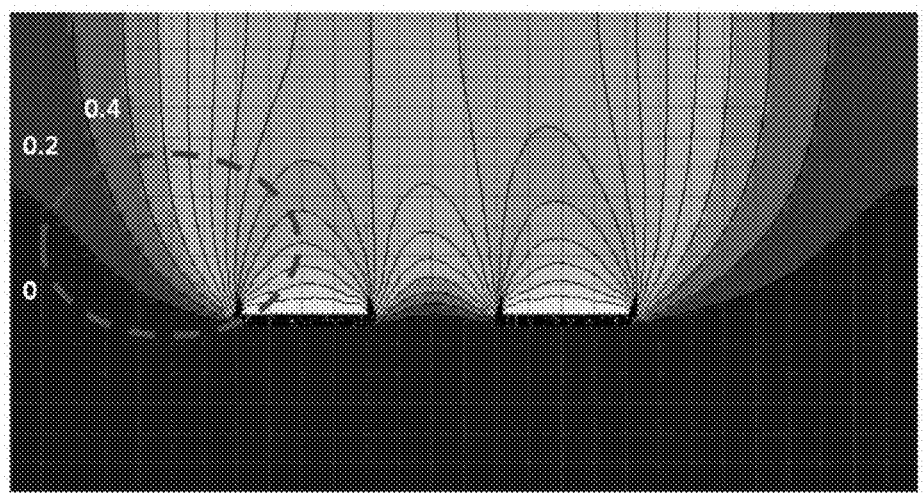

Referring to FIGS. 7A and 7B, when defining the second cutout 81 in the second passivation layer 180b as in the LCD according to an exemplary embodiment of the invention, it is confirmed that the intensity of the electric field is increased near the second cutout 81.

Figure 8:
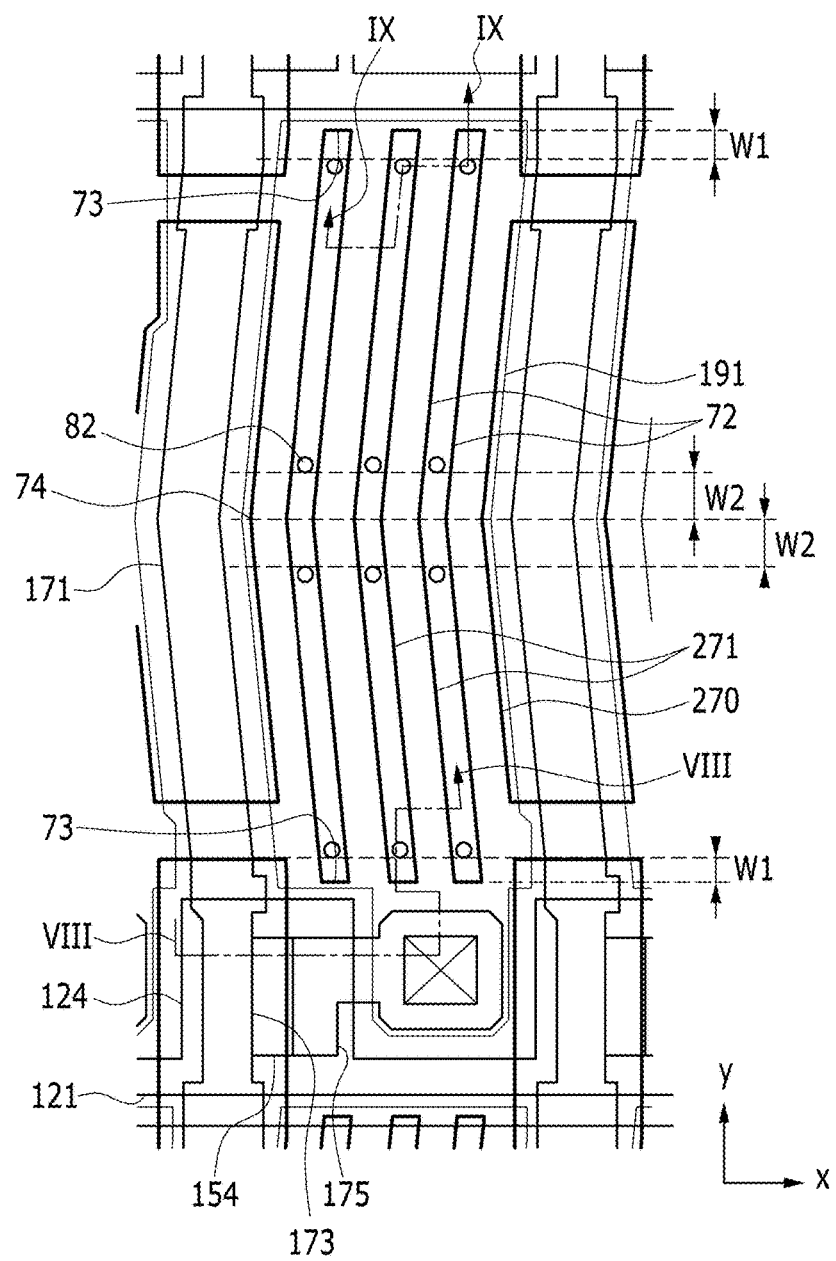
FIG. 8 is a plan view of another exemplary embodiment of an LCD according to the invention.
Figure 9:
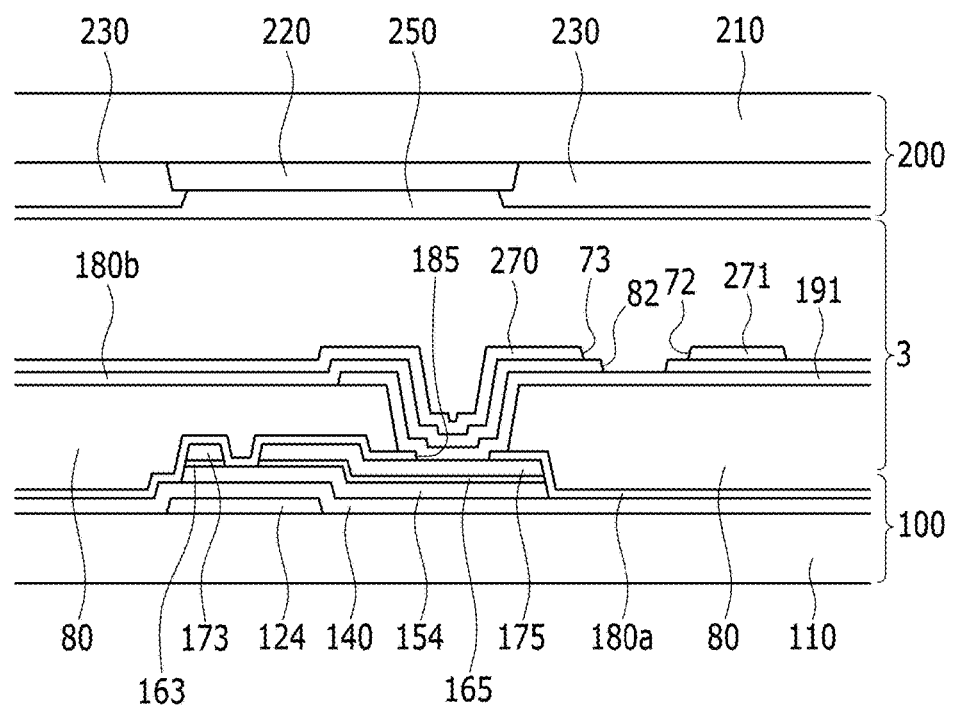
FIG. 9 is a cross-sectional view of the LCD of FIG. 8 taken along line VIII-VIII.
Figure 10:
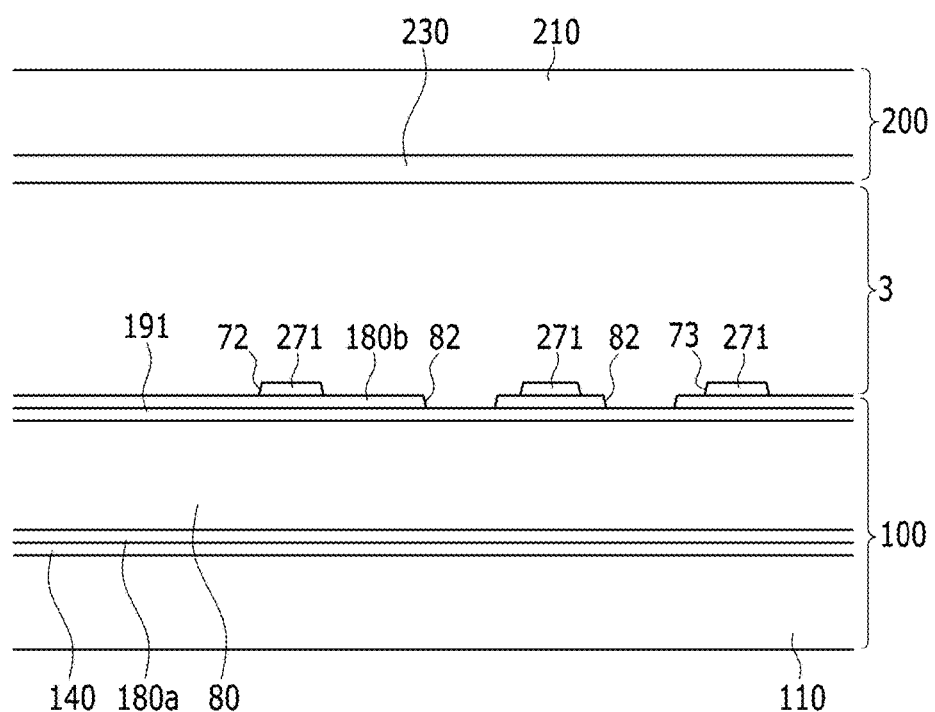
FIG. 10 is a cross-sectional view of the LCD of FIG. 8 taken along line IX-IX.

Next, an LCD according to another exemplary embodiment of the invention will be described with reference to FIGS. 8 to 10. FIG. 8 is a plan view of an LCD according to another exemplary embodiment of the invention. FIG. 9 is a cross-sectional view of the LCD of FIG. 8 taken along line VIII-VIII. FIG. 10 is a cross-sectional view of the LCD of FIG. 8 taken along line IX-IX.

Referring to FIGS. 8 to 10, the LCD according to the exemplary embodiment is similar to the LCD according to the exemplary embodiment described with reference to FIGS. 1 to 3. The detailed description of the same constituent elements is omitted.

The LCD according to an exemplary embodiment of the invention include the first display panel 100 and the second display panel 200 facing each other, and the liquid crystal layer 3 injected therebetween.

Firstly, the first display panel 100 will be described.

The gate conductor including the gate line 121 is disposed on the first insulation substrate 110.

The gate line 121 includes the gate electrode 124 and the wide gate pad portion (not illustrated) for connection with another layer or an external driving circuit.

The gate insulating layer 140 is disposed on the gate conductors 121 and 124.

The semiconductor 154 is disposed on the gate insulating layer 140. The semiconductor 154 may include the oxide semiconductor.

The ohmic contacts 163 and 165 are disposed on the semiconductor 154. In an exemplary embodiment, the ohmic contacts 163 and 165 may be disposed as a pair on the semiconductor 154. In the case where the semiconductor 154 is an oxide semiconductor, the ohmic contacts 163 and 165 may be omitted.

The data conductor including the data line 171 including a source electrode 173 and a drain electrode 175 is disposed on the ohmic contacts 163 and 165 and the gate insulating layer 140.

The data line 171 includes the data pad portion (not illustrated) for connection with another layer or the external driving circuit. The data line 171 transfers a data signal and mainly extends in a vertical direction to cross the gate line 121.

In this case, the data line 171 may have a curved portion having a curved shape in order to obtain maximum transmittance of the LCD, and the curved portion may have a "V" shape in which the curved portion meets in a middle region of a pixel area.

The source electrode 173 is a portion of the data line 171 and is disposed on the same line as the data line 171. The drain electrode 175 may be provided to be parallel to the source electrode 173. Accordingly, the drain electrode 175 is parallel to the portion of the data line 171.

The gate electrode 124, the source electrode 173, and the drain electrode 175 form a TFT in conjunction with the semiconductor 154, and a channel of the TFT is provided in the semiconductor 154 between the source electrode 173 and drain electrode 175.

The first passivation layer 180a is disposed on the data conductors 171, 173, and 175, the gate insulating layer 140, and the exposed portion of the semiconductor 154. The first passivation layer 180a may include the organic insulating material or the inorganic insulating material.

The organic layer 80 is disposed on the first passivation layer 180a. The organic layer 80 may not be provided at a position where a first contact hole 185 that is described later is defined.

The pixel electrode 191 is disposed on the organic layer 80. The pixel electrode 191 may have the planar shape and may be provided as a whole plate in one pixel area. The pixel electrode 191 includes the curved edge parallel to the curved portion of the data line 171. The pixel electrode 191 is physically and electrically connected to the drain electrode 175 through the first contact hole 185 defined in the first passivation layer 180a and the organic layer 80.

The second passivation layer 180b is disposed on the pixel electrode 191. The second passivation layer 180b may include the organic insulating material or the inorganic insulating material.

The common electrode 270 is disposed on the second passivation layer 180b. The common electrode 270 may include the transparent conductive material such as ITO or IZO. A plurality of third cutouts 72 may be defined in the common electrode 270, and a plurality of second branch electrodes 271 may be defined by the plurality of third cutouts 72. The second branch electrode 271 of the common electrode 270 overlaps the pixel electrode 191 with the plate shape. The common electrodes 270 of the adjacent pixels are connected to each other, and may be applied with the common voltage of the predetermined magnitude supplied outside the display area.

Among the third cutout 72, the end portion of the stem portion meeting both end portions 73 adjacent to the gate line 121 extends to be parallel to the stem portion of the third cutout 72. That is, the end portion of the stem portion meeting both end portions 73 of the third cutout 72 is parallel to the first curved portion of the data line 171. Also, the stem portion of the third cutout 72 extends in a predetermined direction to a center portion 74 in which the stem portions extending in the different directions meet.

A fourth cutout 82 may be defined in the second passivation layer 180b at the portion overlapping the third cutout 72 of the common electrode 270.

A portion of the pixel electrode 191 is exposed by the fourth cutout 82, thereby the intensity of the electric field between the pixel electrode 191 and the common electrode 270 is increased in the portion adjacent to the fourth cutout 82.

By defining the fourth cutout 82 at the position adjacent to both end portions 73 of the third cutout 72 and the center portion 74, the intensity of the electric field between the common electrode 270 and the pixel electrode 191 may be increased at the position adjacent to both end portions 73 of the third cutout 72 and the center portion 74.

The fourth cutout 82 is defined between the second branch electrodes 271 of the common electrode 270, and the diameter of the fourth cutout 82 is from about 0.1 µm to about 5 µm. In exemplary embodiments, the shape of the fourth cutout 82 may be the shape having the curved surface such as the circle shape, the oval shape, or the polygon shape such as the triangle and the quadrangle. The fourth cutout 82 is defined at the position that does not overlap the common electrode 270.

In an exemplary embodiment, a first interval W1 between the fourth cutout 82 and both end portions 73 of the third cutout 72 is from about 0.1 µm to about 3 µm. Also, in an exemplary embodiment, a second interval W2 between the fourth cutout 82 from the center portion 74 of the third cutout 72 is from about 0.1 µm to about 3 µm.

As described above, by defining the fourth cutouts 82 at the position adjacent to both end portions 73 of the third cutout 72 and the center portion 74, at the position adjacent to the fourth cutout 82, the intensity of the electric field generated between the common electrode 270 and the pixel electrode 191 may be increased.

As described above, by further increasing the intensity of the electric field generated between the common electrode 270 and the pixel electrode 191 at the position adjacent to both end portions 73 of the third cutout 72 and the center portion 74, the irregular movement of the liquid crystal molecules generated at both end portions 73 of the third cutout 72 and the center portion 74 may be effectively prevented from being moved along with the stem portion of the third cutout 72.

Accordingly, although the center portion 74 and both end portions 73 of the third cutout 72 have the different angle from the stem portion of the third cutout 72, the transmittance deterioration due to the irregular movement of the liquid crystal molecules may be effectively prevented in the end portions of the cutouts and the center portion where the stem portions of the cutouts extending in the different directions meet each other.

Also, since the both end portions 73 of the third cutout 72 and the center portion 74 are not provided to have the different angle from the stem portion of the third cutout 72, the transmittance deterioration of the LCD may be effectively prevented.

The first alignment layer (not shown) is disposed on the common electrode 270.

Next, the second display panel 200 will be described.

The light blocking member 220, the color filter 230, the overcoat 250, and the second alignment layer (not shown) are disposed on the second substrate 210 including transparent glass or plastic. Also, according to the LCD according to another exemplary embodiment of the invention, at least one of the color filter and the light blocking member may be provided in the first display panel 100.

The liquid crystal layer 3 may have positive dielectric anisotropy or negative dielectric anisotropy. The liquid crystal molecules of the liquid crystal layer 3 may be aligned to have a pretilt in a predetermined direction, and the pretilt direction of the liquid crystal molecules may be changed according to the dielectric anisotropy of the liquid crystal layer 3.

The backlight unit (not shown) generating and providing light to the two display panels 100 and 200 may be provided outside the substrate 110 of the first display panel 100.

The pixel electrode 191 applied with the data voltage generates an electric field in the liquid crystal layer 3 together with the common electrode 270 applied with a common voltage, thereby determining the orientation of the liquid crystal molecules of the liquid crystal layer 3 and displaying a corresponding image.

Next, the LCD according to another exemplary embodiment of the invention will be described with reference to FIG. 11 as well as FIGS. 8 and 9.

Figure 11:
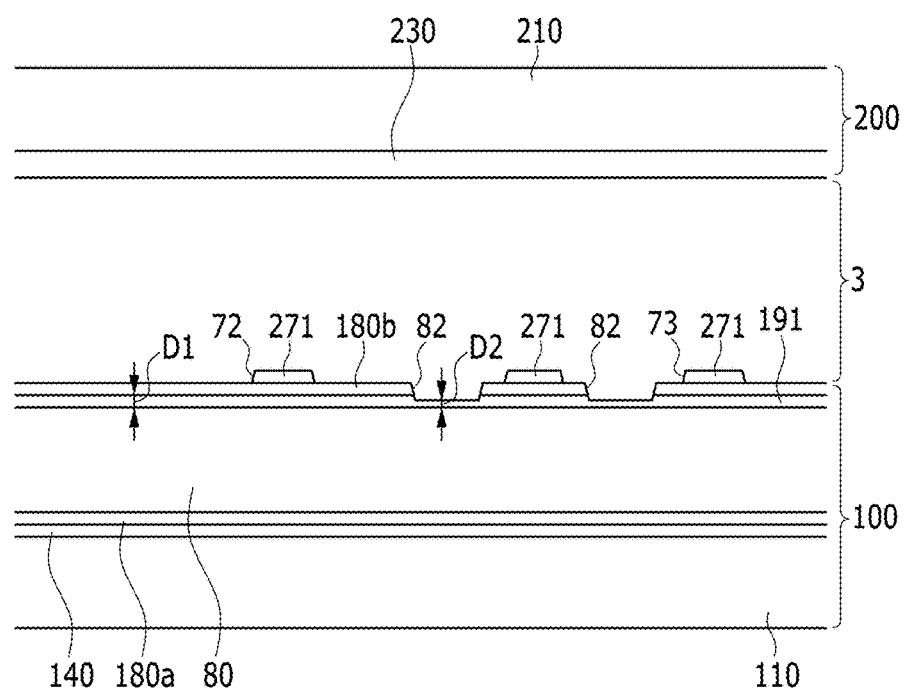
FIG. 11 is a cross-sectional view of another exemplary embodiment of an LCD according to the invention taken along the line IX-IX of FIG. 8.

Referring to FIG. 11 as well as FIGS. 8 and 9, the LCD according to the exemplary embodiment is similar to the LCD according to the exemplary embodiment shown in FIGS. 8 to 10. The detail description for the same constituent elements is omitted.

Firstly, the first display panel 100 will be described.

The gate conductor including the gate line 121 is disposed on the first insulation substrate 110.

The gate line 121 includes the gate electrode 124 and the wide gate pad portion (not illustrated) for connection with another layer or an external driving circuit.

In an exemplary embodiment, the gate insulating layer 140 including a silicon nitride (SiNx) or a silicon oxide (SiOx) is disposed on the gate conductors 121 and 124.

The semiconductor 154 including amorphous silicon or polysilicon is disposed on the gate insulating layer 140. The semiconductor 154 may include the oxide semiconductor.

The ohmic contacts 163 and 165 are disposed on the semiconductor 154. The ohmic contacts 163 and 165 may be disposed as a pair on the semiconductor 154. In the case where the semiconductor 154 is an oxide semiconductor, the ohmic contacts 163 and 165 may be omitted.

The data conductor including the data line 171 including a source electrode 173 and a drain electrode 175 is disposed on the ohmic contacts 163 and 165 and the gate insulating layer 140.

The data line 171 includes the data pad portion (not illustrated) for connection with another layer or the external driving circuit. The data line 171 transfers a data signal and mainly extends in a vertical direction to cross the gate line 121.

In this case, the data line 171 may have a curved portion having a curved shape in order to obtain maximum transmittance of the LCD, and the curved portion may have a "V" shape in which the curved portion meets in a middle region of a pixel area.

The source electrode 173 is a portion of the data line 171 and is disposed on the same line as the data line 171. The drain electrode 175 may be provided to be parallel to the source electrode 173. Accordingly, the drain electrode 175 is parallel to the portion of the data line 171.

The gate electrode 124, the source electrode 173, and the drain electrode 175 form the TFT in conjunction with the semiconductor 154, and the channel of the TFT is provided in the semiconductor 154 between the source electrode 173 and drain electrode 175.

The first passivation layer 180a is disposed on the data conductors 171, 173, and 175, the gate insulating layer 140, and the exposed portion of the semiconductor 154. The first passivation layer 180a may include the organic insulating material or the inorganic insulating material.

The organic layer 80 is disposed on the first passivation layer 180a. The organic layer 80 is disposed on the data line 171, thereby preventing unnecessary coupling between the electrode disposed on the organic layer 80 and the data line 171.

The organic layer 80 may not be provided at the position where the first contact hole 185 that is described later is defined.

The pixel electrode 191 is disposed on the organic layer 80. The pixel electrode 191 may have the planar shape and may include the whole plate on one pixel area. The pixel electrode 191 includes the curved edge parallel to the curved portion of the data line 171. The pixel electrode 191 is physically and electrically connected to the drain electrode 175 through the first contact hole defined in the first passivation layer 180a and the organic layer 80.

The second passivation layer 180b is disposed on the pixel electrode 191. The second passivation layer 180b may include the organic insulating material or the inorganic insulating material.

The common electrode 270 is disposed on the second passivation layer 180b. The common electrode 270 may include the transparent conductive material such as ITO or IZO. A plurality of third cutouts 72 is defined in the common electrode 270, and a plurality of second branch electrodes 271 is defined by the plurality of third cutouts 72. The second branch electrode 271 of the common electrode 270 overlaps the pixel electrode 191 with the plate shape. The common electrodes 270 of the adjacent pixels are connected to each other, and may be applied with the common voltage of the predetermined magnitude supplied outside the display area.

Among the third cutout 72, the end portion of the stem portion meeting both end portions 73 adjacent to the gate line 121 extends to be parallel to the stem portion of the third cutout 72. That is, the end portion of the stem portion meeting both end portions 73 of the third cutout 72 is parallel to the first curved portion of the data line 171. Also, the stem portion of the third cutout 72 extends in the predetermined direction to the center portion 74 in which the stem portions extending in the different directions meet.

The fourth cutout 82 may be defined in the second passivation layer 180b at the portion overlapping the third cutout 72 of the common electrode 270. The portion of the pixel electrode 191 is exposed by the fourth cutout 82. According to the LCD according to the exemplary embodiment, differently from the exemplary embodiment shown in FIGS. 8 to 10, the first thickness D1 of the pixel electrode 191 exposed through the fourth cutout 82 is less than the second thickness D2 of the pixel electrode 191 of the other portion. That is, the height of the pixel electrode 191 exposed through the fourth cutout 82 is lower than the height of the pixel electrode 191 of the other portion. When defining the fourth cutout 82, the portion of the pixel electrode 191 may be removed together.

By defining the fourth cutout 82 at the position adjacent to both end portions 73 of the third cutout 72 and the center portion 74, the intensity of the electric field between the common electrode 270 and the pixel electrode 191 may be increased at the position adjacent to both end portions 73 of the third cutout 72 and the center portion 74.

The fourth cutout 82 is disposed between the second branch electrodes 271 of the common electrode 270, and the diameter of the fourth cutout 82 is from about 0.1 µm to about 5 µm. The shape of the fourth cutout 82 may be the shape having the curved surface such as the circle shape, the oval shape, or the polygon shape such as the triangle and the quadrangle. The fourth cutout 82 is defined at the position that does not overlap the common electrode 270.

In an exemplary embodiment, the first interval W1 between the fourth cutout 82 and both end portions 73 of the third cutout 72 is from about 0.1 µm to about 3 µm. Also, in an exemplary embodiment, the second interval W2 between the fourth cutouts 82 from the center portion 74 of the third cutout 72 is from about 0.1 µm to about 3 µm.

As described above, by defining the fourth cutouts 82 at the position adjacent to both end portions 73 of the third cutout 72 and the center portion 74, at the position adjacent to the fourth cutout 82, the intensity of the electric field generated between the common electrode 270 and the pixel electrode 191 may be further increased.

As described above, by further increasing the intensity of the electric field generated between the common electrode 270 and the pixel electrode 191 at the position adjacent to both end portions 73 of the third cutout 72 and the center portion 74, the irregular movement of the liquid crystal molecules generated at both end portions 73 of the third cutout 72 and the center portion 74 may be effectively prevented from being moved along with the stem portion of the third cutout 72.

Accordingly, although the center portion 74 and both end portions 73 of the third cutout 72 are defined to have the different angle from the stem portion of the third cutout 72, the transmittance deterioration due to the irregular movement of the liquid crystal molecules may be effectively prevented in the end portions of the cutouts and the center portion where the stem portions of the cutouts extending in the different direction meet each other.

Also, since both end portions 73 of the third cutout 72 and the center portion 74 are not provided to have the different angle from the stem portion of the third cutout 72, the transmittance deterioration of the LCD may be effectively prevented.

The first alignment layer (not shown) is disposed on the common electrode 270.

Next, the second display panel 200 will be described.

The light blocking member 220, the color filter 230, the overcoat 250, and the second alignment layer (not shown) are disposed on the second substrate 210 including transparent glass or plastic. Also, according to the LCD according to another exemplary embodiment of the invention, at least one of the color filter and the light blocking member may be provided in the first display panel 100.

The liquid crystal layer 3 may have positive dielectric anisotropy or negative dielectric anisotropy. The liquid crystal molecules of the liquid crystal layer 3 may be aligned to have a pretilt in a predetermined direction, and the pretilt direction of the liquid crystal molecules may be changed according to the dielectric anisotropy of the liquid crystal layer 3.

The backlight unit (not shown) generating and providing light to the two display panels 100 and 200 may be provided outside the substrate 110 of the first display panel 100.

The pixel electrode 191 applied with the data voltage generates an electric field in the liquid crystal layer 3 together with the common electrode 270 applied with a common voltage, thereby determining the orientation of the liquid crystal molecules of the liquid crystal layer 3 and displaying a corresponding image.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a substrate;
   a gate line and a data line disposed on the substrate;
   a first passivation layer disposed on the gate line and the data line;
   a first electrode disposed on the first passivation layer;
   a second passivation layer disposed on the first electrode; and
   a second electrode which is disposed on the second passivation layer and includes a plurality of branch electrodes defined by a plurality of first cutouts,
   wherein the second passivation layer has a second cutout overlapping a portion of the plurality of first cutouts and exposing the first electrode,
   the second cutout is defined close to an end of the first cutout, and
   a first thickness of the first electrode overlapping the second cutout is less than a second thickness of the first electrode which does not overlap the second cutout.

2. The liquid crystal display of claim 1, wherein a diameter of the second cutout is from about 0.1 micrometer to about 5 micrometers.

3. The liquid crystal display of claim 2, wherein an interval between the end of the first cutout and the second cutout is from about 0.1 micrometer to about 3 micrometers.

4. The liquid crystal display of claim 3, wherein the first electrode has a plane shape of a plate which is provided through a whole of a pixel area.

5. The liquid crystal display of claim 4, wherein the plurality of branch electrodes of the second electrode overlaps the first electrode.

6. The liquid crystal display of claim 1, wherein an interval between the end of the first cutout and the second cutout is from about 0.1 micrometers to about 3 micrometers.

7. The liquid crystal display of claim 1, wherein:
   a first cutout of the plurality of the first cutouts includes a first stem portion and a second stem portion extending in different directions;
   the first stem portion and the second stem portion meet each other at a center portion; and
   the second cutout is defined to be close to an end of the first cutout and the center portion.

8. The liquid crystal display of claim 7, wherein a diameter of the second cutout is from about 0.1 micrometers to about 5 micrometers.

9. The liquid crystal display of claim 8, wherein:
   an interval of the end of the first cutout and the second cutout is from about 0.1 micrometer to about 3 micrometers; and
   the interval between the center portion and the second cutout is from about 0.1 micrometer to about 3 micrometers.

10. The liquid crystal display of claim 9, wherein the first electrode is provided on a whole of a pixel area to have a plane shape of a plate.

11. The liquid crystal display of claim 10, wherein the plurality of branch electrodes of the second electrode overlaps the first electrode.

12. The liquid crystal display of claim 7, wherein:
   an interval between the end of the first cutout and the second cutout of the plurality of second cutouts is from about 0.1 micrometer to about 3 micrometers; and
   the interval between the center portion and the second cutout is from about 0.1 micrometer to about 3 micrometers.

* * * * *